United States Patent

[11] 3,543,814

| [72] | Inventor | Peter A. Aluotto<br>3904 Fillmore Ave., Brooklyn, New York 11211 |
|---|---|---|
| [21] | Appl. No. | 549,521 |
| [22] | Filed | May 12, 1966 |
| [45] | Patented | Dec. 1, 1970 |

[54] COFFEE DISPENSER
1 Claim, 3 Drawing Figs.

[52] U.S. Cl. ................................................. 141/335,
141/352, 141/360; 222/162, 222/501
[51] Int. Cl. .................................................. B67c 11/04
[50] Field of Search .......................................... 141/335,
336, 344, 345, 351, 360, 352, 356, 362—364, 331;
222/162, 518, 501

[56] References Cited
UNITED STATES PATENTS

| 580,602 | 4/1897 | Jacobs ........................ | 222/518X |
| 947,917 | 2/1910 | Kollenberg ................... | 141/351UX |
| 1,676,034 | 7/1928 | Langdon ...................... | 222/518X |
| 2,489,162 | 11/1949 | Schulman..................... | 222/518X |
| 2,575,124 | 11/1951 | Pollitt........................... | 222/162 |
| 3,163,188 | 12/1964 | Morris........................... | 141/351X |
| 756,397 | 4/1904 | McNamera................... | 141/362X |
| 1,864,133 | 6/1932 | Hammer....................... | 222/501X |
| 2,751,128 | 6/1956 | Prince .......................... | 222/501X |
| 2,898,016 | 8/1959 | Franck et al. ................. | 222/501 |
| 1,435,896 | 11/1922 | Hoskins........................ | 222/501 |
| 1,883,771 | 10/1932 | Duncan ........................ | 222/518X |
| 2,182,878 | 12/1939 | Pipenhagen................... | 222/501X |

*Primary Examiner*—Laverne D. Geiger
*Assistant Examiner*—Edward J. Earls
*Attorney*—Pennie, Edmonds, Morton, Taylor and Adams

ABSTRACT: A coffee dispenser having a valve assembly positioned at its lower end with a conical deflector for distributing a desired amount of coffee to a percolator.

Patented Dec. 1, 1970
3,543,814
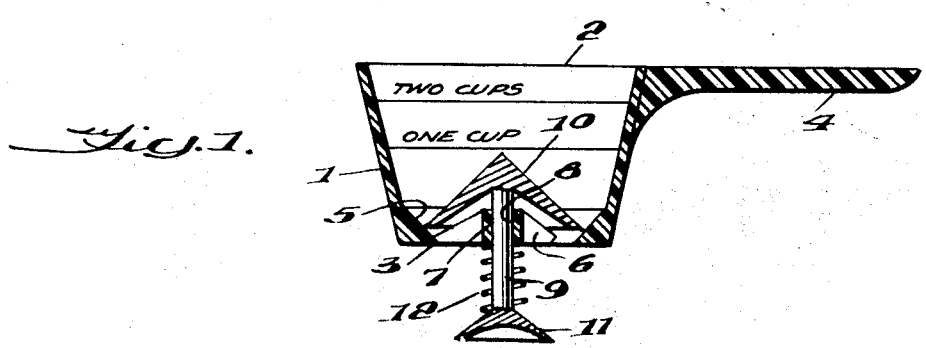
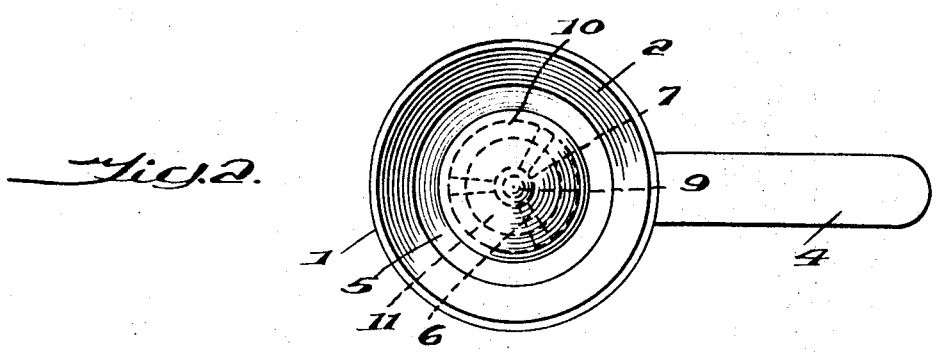
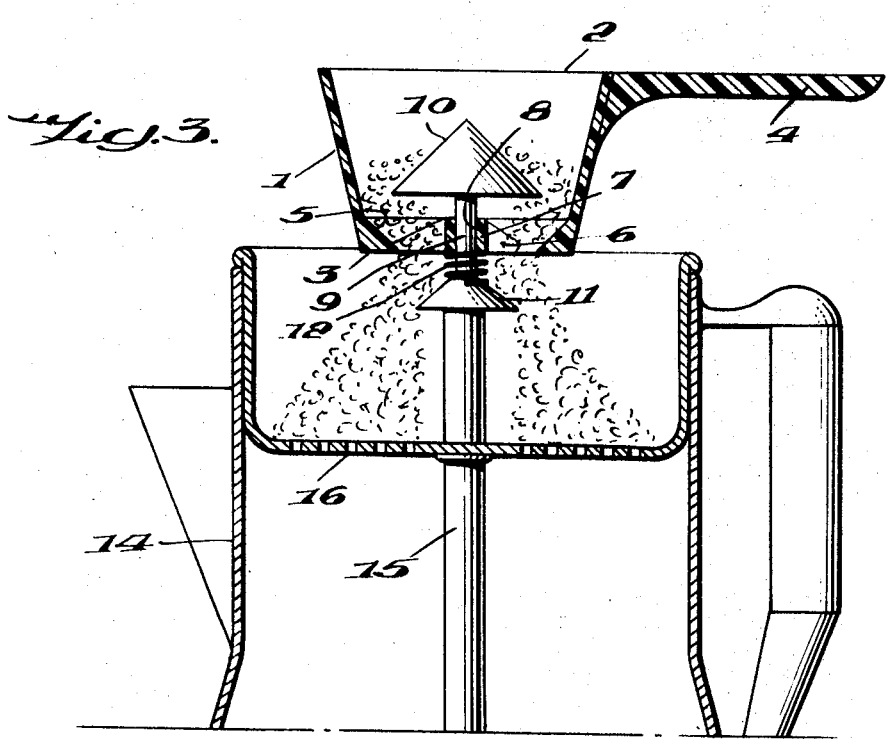
INVENTOR
PETER A. ALUOTTO,
BY Pennie Edmonds Morton
Taylor & Adams
ATTORNEYS

COFFEE DISPENSER

This invention relates to a coffee dispenser for discharging a desired amount of coffee into a percolator or the like.

More particularly, this invention comprises a generally cylindrical casing open at both the top and the bottom and a handle extending outwardly from the casing. At the bottom of the casing there is positioned a valve assembly for resiliently closing the bottom end of the casing. This valve assembly comprises a valve stem supported to move axially within said container along with a valve and a deflector secured to the upper and lower end of the stem, respectively. Additionally, a spring is positioned to surround the stem and to urge the valve downwardly to close the lower end of the casing.

This novel arrangement makes it possible to conveniently, efficiently and speedily dispense a desired amount of coffee in a percolator or the like thus eliminating any possible spillage or waste problems.

A more complete appreciation of the invention and many of the attendant advantages thereof will be discerned as the same becomes better understood by reference to the following detailed description when considered in connection with the accompanying drawings wherein:

FIG. 1 is a view of the invention in central vertical section;

FIG. 2 is a top view of the invention; and

FIG. 3 is a view similar to FIG. 1 showing the invention applied to a coffee maker of the percolator type.

Referring now to the drawings, the novel coffee dispenser comprises a generally circular casing 1 open at its top end 2 and its bottom end 3. An elongated handle 4 extends laterally from the casing 1 for easy gripping.

Projecting inwardly and around the inner periphery of the casing 1, at the bottom end 3, is a circular valve seat 5 the surface of which slopes inwardly and downwardly. From seat 5, the inner walls of the dispenser flare upwardly for a purpose which will be referred to later on. A plurality of thin ribs 6 extend radially inwardly from the circular valve seat 5 and support a cylindrical boss 7 within the opening at the bottom 3 of the casing 1. The boss 7 carries a hollow bore 8 extending through its axis and projecting along the axis of the casing 1.

Slidably supported in a vertical direction within the bore 8 of the boss 7 is an elongated narrow valve stem 9.

Secured to the upper end of the stem 9 is a conical shaped valve 10 whose side sections taper upwardly to a point whose circular lower edge is thin or sharp so as to engage the sloping valve seat 5 in such a way as to effectively prevent the passage of the granular ground coffee. The lower end of the valve stem 9, there is attached a conical shaped deflector 11 which has a concave undersurface as shown. The deflector 11 is so positioned that its side also tapers in an upward direction. Situated around the stem 9 and between the deflector 11 and the boss 7, is a compressible spring 12. The particular length of the spring is not critical; however, it must be so arranged as to normally maintain the valve 10 in contact with the valve seat 5.

FIG. 1 and FIG. 2 illustrate the novel dispenser with the valve assembly in a "filled" or "filling" position. That is to say, in this position, the ground coffee, which is poured into the casing 1, is retained therein since the conical valve 10 is in resting contact with the valve seat 5 thereby closing the bottom opening of the casing 1.

The inside surface of the casing 1 may be calibrated to carry level indicators, as shown in FIG. 1, so that the operator knows exactly the quantity of ground coffee that is needed to make the desired number of cups of coffee.

FIG. 3 illustrates the novel coffee dispenser disposed over a typical coffee percolator, generally indicated by 14, into which there is positioned an upstanding hollow tube 15 that supports a cylindrical perforated strainer 16.

When it is desired to dispense the ground coffee from the dispenser into the strainer 16 of the coffee percolator 14, the device is positioned over the strainer 16 with the deflector 11 in contact with the tube 15 and then moved downwardly. This downward force compresses the spring 12 and unseats the valve 10 from contact with the valve seat 5. The conical deflector 11 is concave on its underside and completely covers the upper end of tube 15, not allowing the coffee to enter this tube, and at the same time preventing deflector 11 from slipping off the tube. The ground coffee floats downwardly by gravity onto conical deflector 11 bouncing off in a full circle outwardly into the strainer 16 and distributing the coffee evenly in the strainer without the possibility of ground coffee entering tube 15. The inner walls of the casing are angled or flared in the form of an inverted cone. This angular arrangement is very important because as the conical deflector 11 rises the opening between the cone and walls becomes larger and valve 11 being forced up through the coffee causes the coffee to slide off the sloping sides of the valve thus permitting the entire contents of casing 1 to be released without any residue remaining therein.

When the desired amount of ground coffee is dispensed into the strainer 16, the casing 1 is moved upwardly. This movement enables the spring 12 to extend or decompress and force the valve 10 into contact relationship with valve seat 5 thereby closing the bottom of the casing 1.

From the above discussion, it is evident that this novel coffee dispenser makes it possible to easily, guidably and accurately fill a coffee pot with a desired quantity of coffee grounds by a single swift, efficient movement by the operator.

Having thus described the invention with particular reference to the preferred form thereof, it will be obvious to those skilled in the art to which the invention pertains, after understanding the invention, that various changes and modifications may be made therein without departing from the spirit and scope of my invention as defined by the claims appended hereto.

I claim:

1. A coffee dispenser comprising a member having inwardly and downwardly sloping sidewalls in the form of an inverted truncated cone open at both top and bottom, and having an inwardly and downwardly sloping valve seat encircling the inner bottom peripheral edge of said sidewalls, the slope of the valve seat being more acute with respect to the vertical than the slope of the sidewalls, a cone-shaped hollow valve member having a sharp circular edge at the bottom thereof for cooperating with said valve seat, a stem carrying said valve member at its upper end, a conical shaped deflector that is concave on its underside attached to said stem at its lower end, means for supporting said stem for vertical sliding movement, and resilient means for urging the valve stem in the downward direction to move the edge of the valve member against the valve seat, said valve seat and said sidewalls flaring upwardly and outwardly from the periphery of said valve when in contact with the valve seat so that as the valve is raised forcing its way through the coffee the opening surrounding the valve becomes larger and permits the entire contents of the dispenser to be released without leaving any residue.